United States Patent
Overmyer et al.

[15] 3,698,137
[45] Oct. 17, 1972

[54] GRINDER WITH MOVABLY SUPPORTED FRAME

[72] Inventors: Robert C. Overmyer, Indianapolis, Ind.; John R. Scheel, Ocqueoc, Mich.

[73] Assignee: Hawley Manufacturing Corporation, Indianapolis, Ind.

[22] Filed: July 13, 1971

[21] Appl. No.: 162,240

[52] U.S. Cl..................................51/99, 51/273
[51] Int. Cl.........B24b 7/00, B24b 9/00, B24b 55/06
[58] Field of Search..........417/313, 234; 51/99, 273; 98/115 VM, 86; 144/252; 143/157 B

[56] References Cited

UNITED STATES PATENTS

| | | | |
|---|---|---|---|
| 1,966,930 | 7/1934 | Leander | 51/99 |
| 1,999,138 | 4/1935 | Mason | 51/273 |
| 2,923,227 | 2/1960 | Hawley | 98/86 |
| 3,478,668 | 11/1969 | Scheel | 98/115 VM |
| 3,498,004 | 3/1970 | Hensley | 51/99 |

Primary Examiner—Othell M. Simpson
Attorney—Hood, Gust, Lundy, Irish & Coffey

[57] ABSTRACT

A system for use with a cutting wheel to capture and dispose of the dust discharged from such a wheel during operation. The term "cutting wheel" is used herein to mean any rotor including a belt or web traveling about one or more pulleys which, when brought into contact with a piece of work, will progressively remove particles of the work material, whether in a cut-off operation or in what is usually referred to as a grinding, abrading, shaping or polishing operation. The system is primarily intended for use with a relatively heavy wheel assembly which is supported, with its motive power, for limited, substantially universal movement relative to the work, and comprises a continuously-evacuated, elongated duct, a car defining a chamber continuously in communication with the interior of the duct as it moves along the length of the duct, an air scoop positioned in or near the stream of dust emanating from the wheel during operation and an articulated conduit providing communication and a driving connection between the scoop and the car.

10 Claims, 17 Drawing Figures

PATENTED OCT 17 1972

INVENTORS
ROBERT C. OVERMYER
JOHN R. SCHEEL
BY
Hood, Gust, Irish, Lundy & Coffey
ATTORNEYS

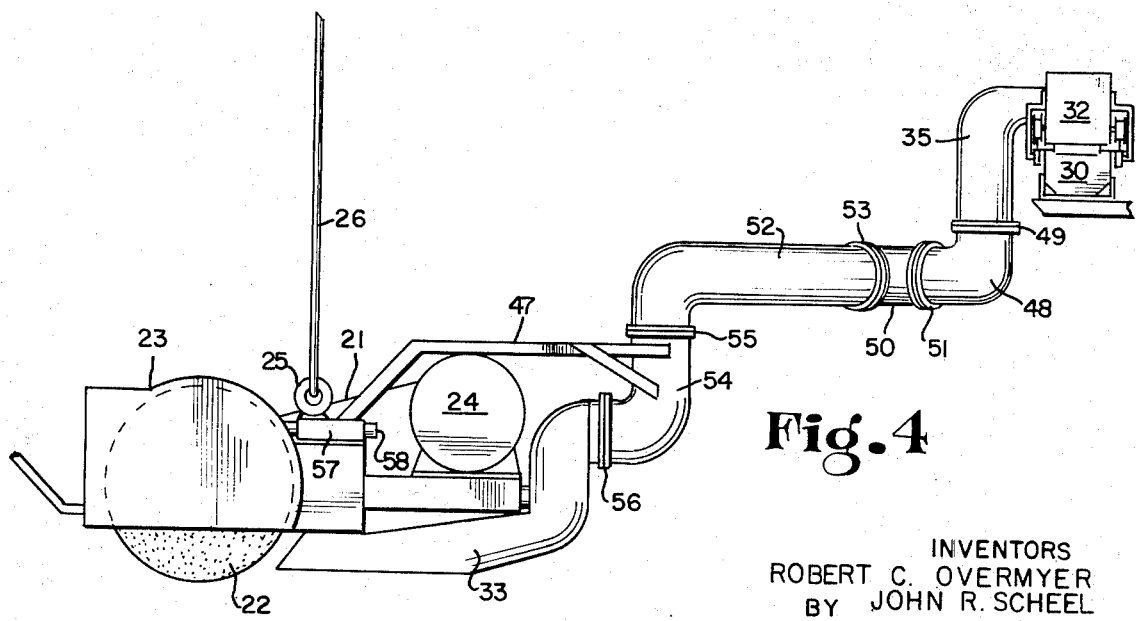

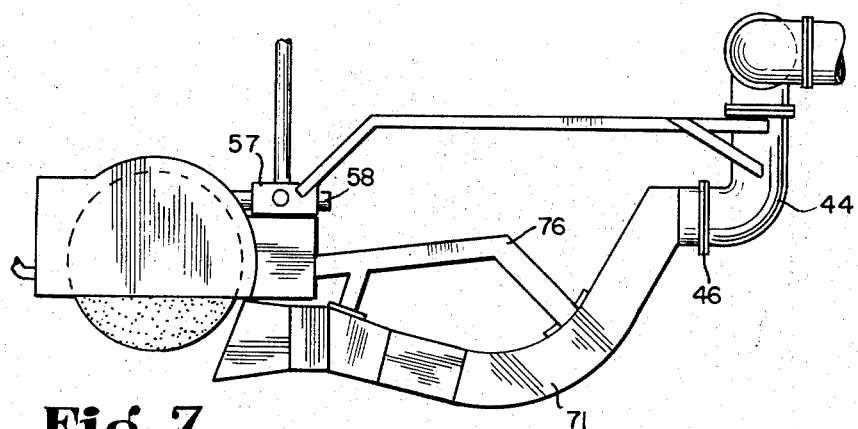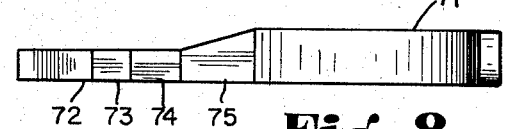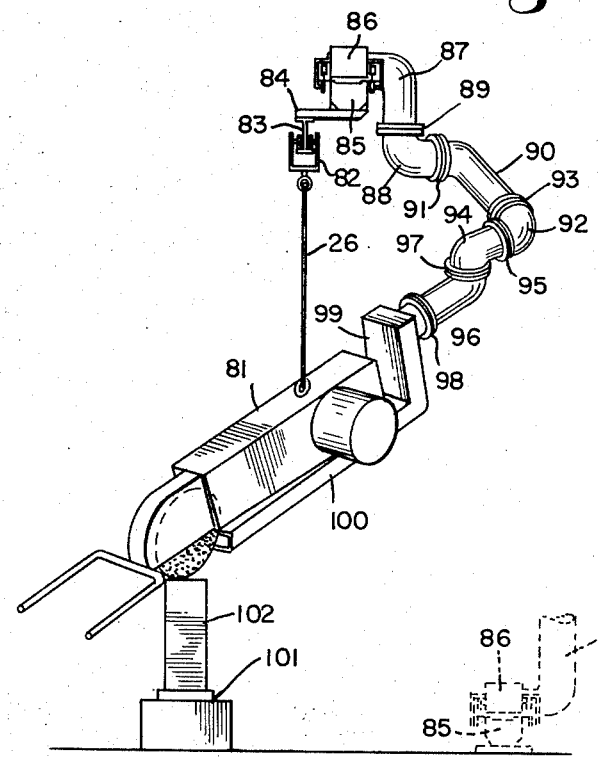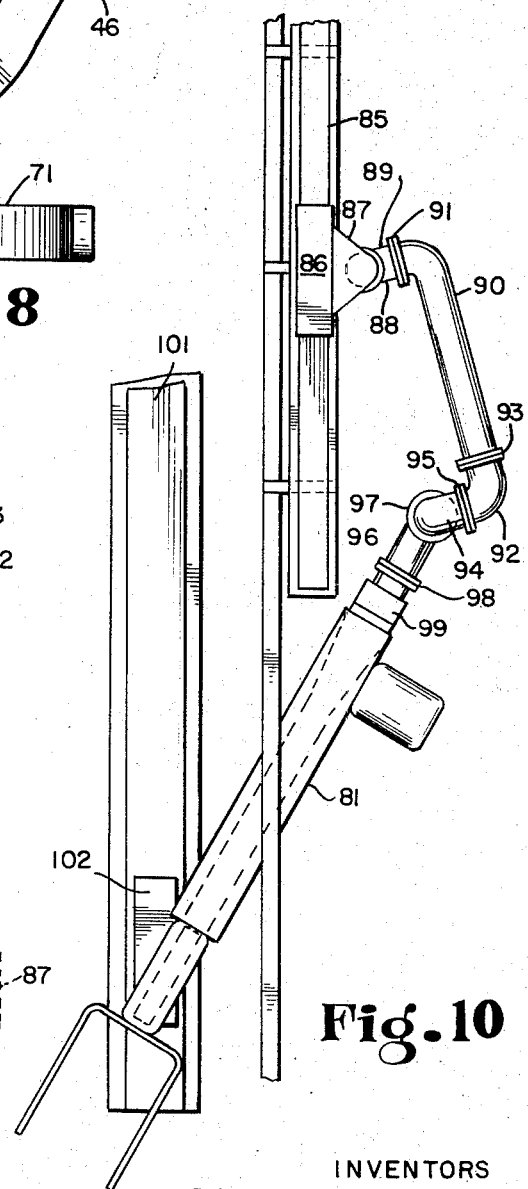

INVENTORS
ROBERT C. OVERMYER
JOHN R. SCHEEL
BY

*Hood, Gust, Irish, Lundy & Coffey*
ATTORNEYS

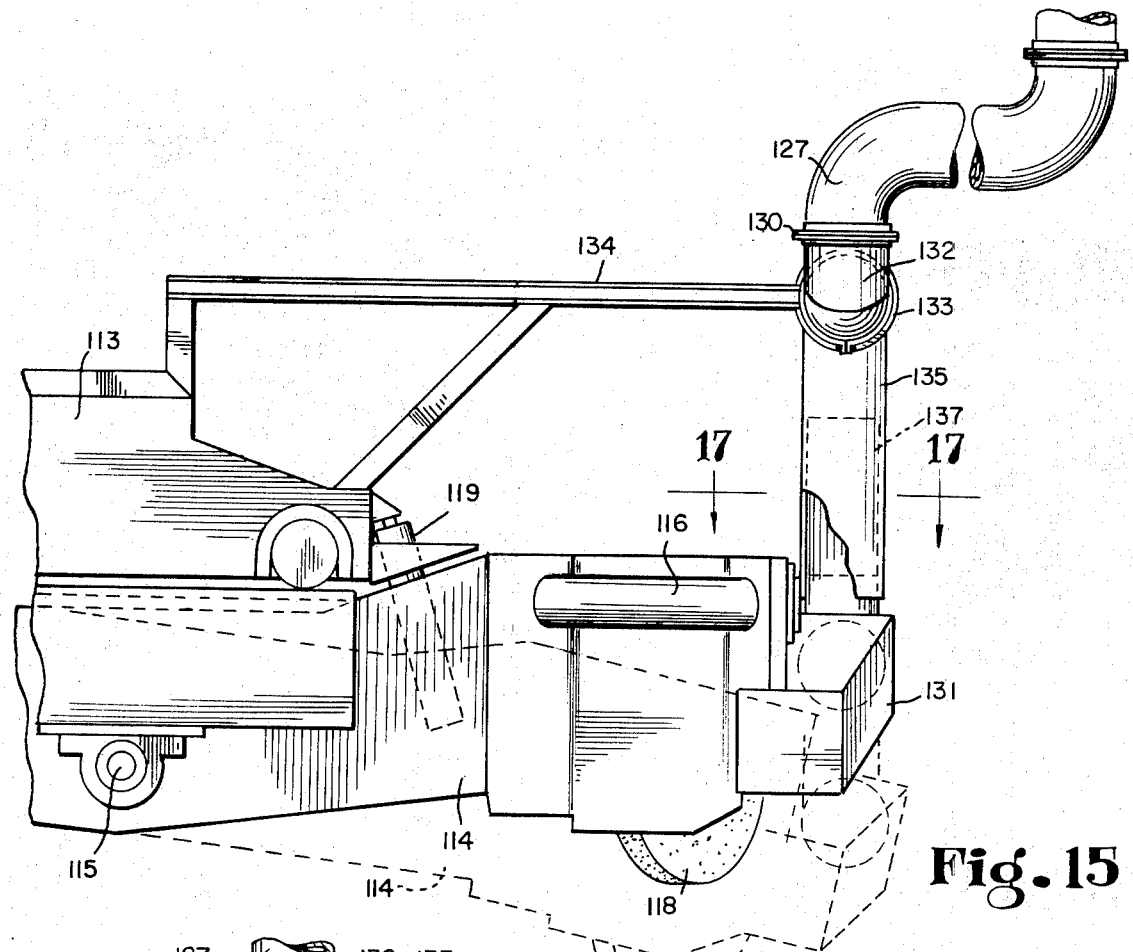
Fig. 15
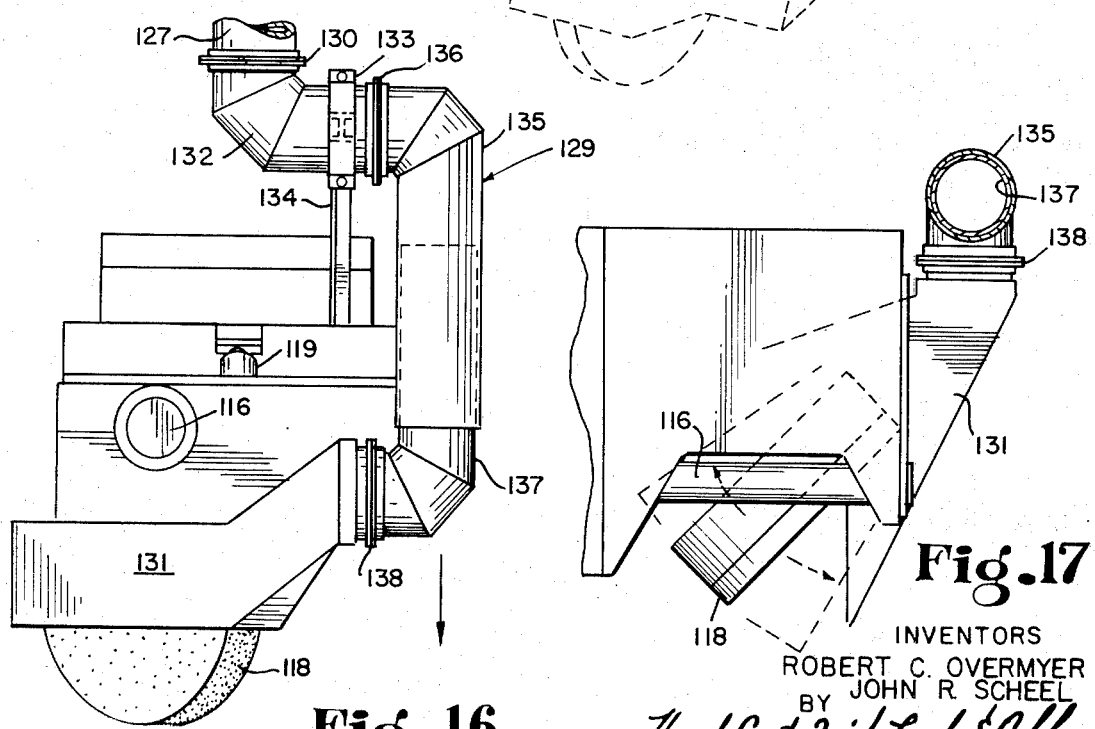
Fig. 16
Fig. 17
INVENTORS
ROBERT C. OVERMYER
JOHN R. SCHEEL
BY
Hood, Gust, Irish, Lundy & Coffey
ATTORNEYS

GRINDER WITH MOVABLY SUPPORTED FRAME

The present invention relates to the maintenance of a clear atmosphere in the vicinity of abrasive working tools and is particularly concerned with the provision of means moving with a heavy, mechanically-supported tool which is capable of limited, substantially universal movement relative to the work piece, to capture and dispose of at least the dust, and in some cases the relatively heavy particles removed from the work, to prevent pollution of the immediate environment. A primary object of the invention, then, is to provide an apparatus, including an air scoop mounted to maintain a position in or near the stream of dust emanating from such a tool, and to provide means whereby, at minimum cost and with minimum complication, that scoop may be maintained always in communication with a source of vacuum whereby an air stream through the scoop will entrain the emissions from the tool to carry them away to a point of disposal, thus preventing dispersion of such emissions into the environmental atmosphere.

To that end, we have used a known means for maintaining a movable air receptor in fluid communication with an evacuated duct, examples of such means being disclosed in U.S. Pat. Nos. to Hawley 2,923,227 and Scheel 3,478,668, and have provided novel means for establishing fluid communication and a driving connection between the above-mentioned scoop and such apparatus to accommodate the erratic gyrations of a tool of the character here under consideration.

Further objects and advantages of the present invention will appear as the description proceeds.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIG. 3 is a fragmentary plan of a modified form of the apparatus illustrated in FIG. 1;

FIG. 4 is a side elevation of the apparatus shown in FIG. 3;

Figure 1:
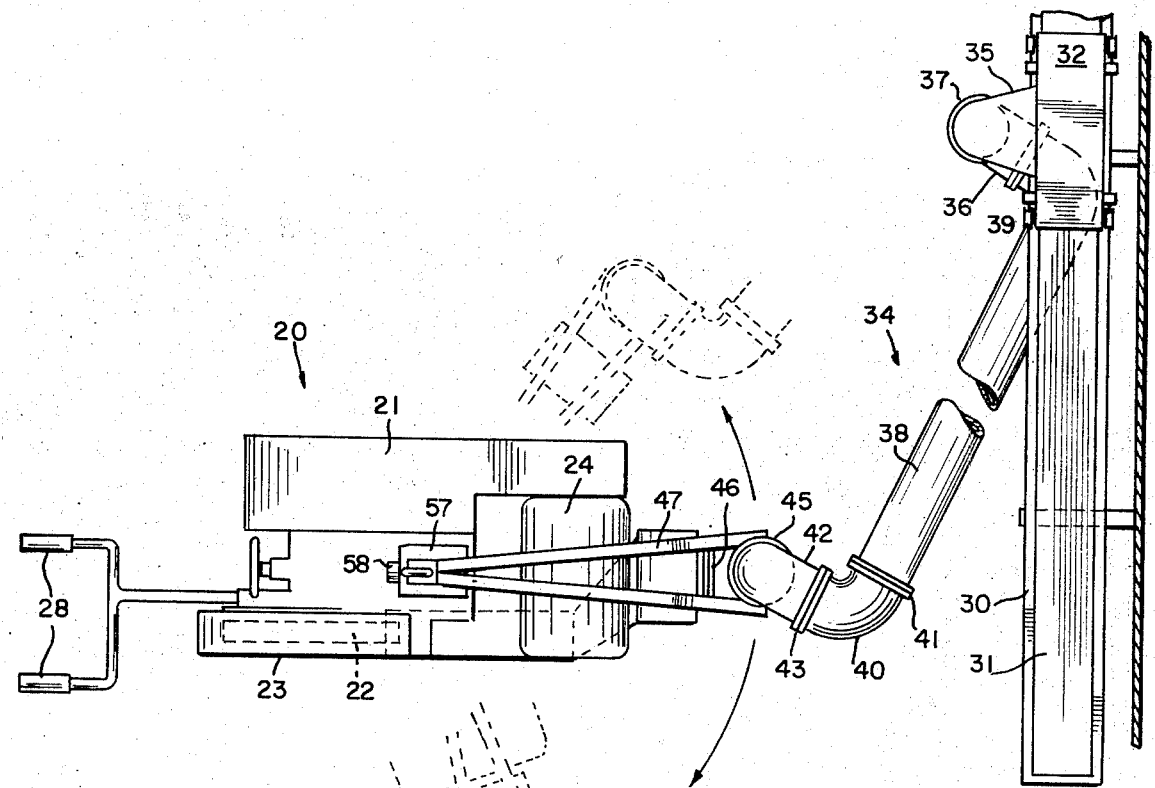
FIG. 1 is a plan view of a system constructed in accordance with the present invention and utilizing one commercial form of a tool known as a swing grinder.
Figure 2:
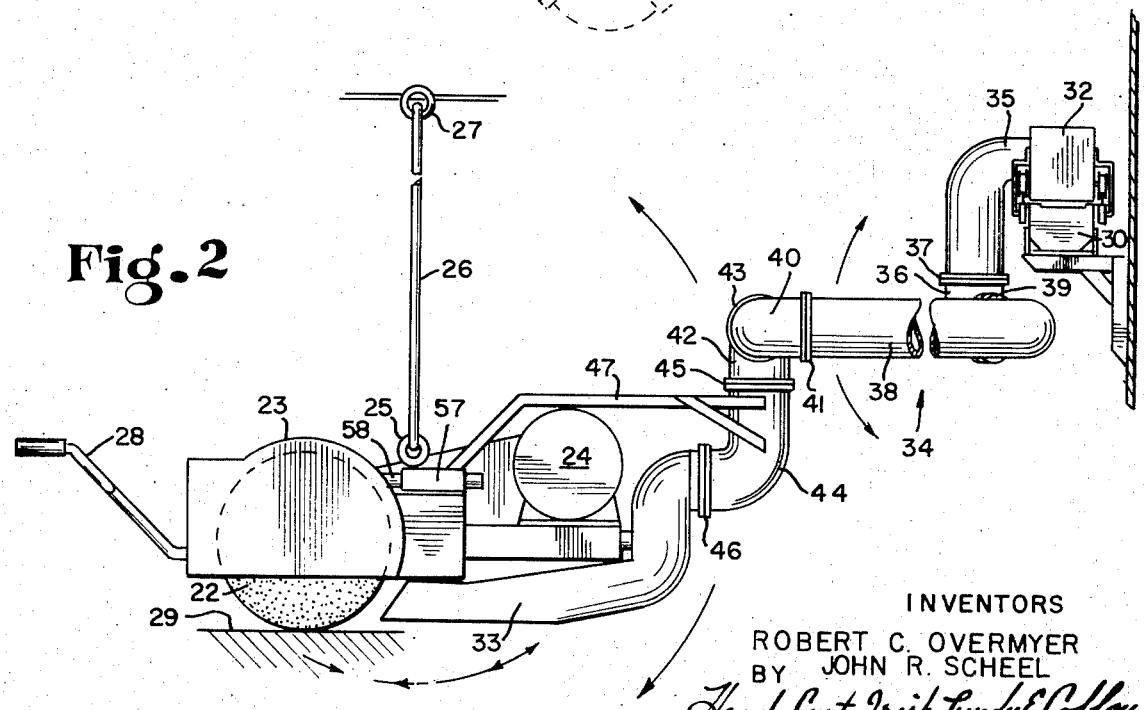
FIG. 2 is a side elevation of the apparatus illustrated in FIG. 1.
Figure 11:
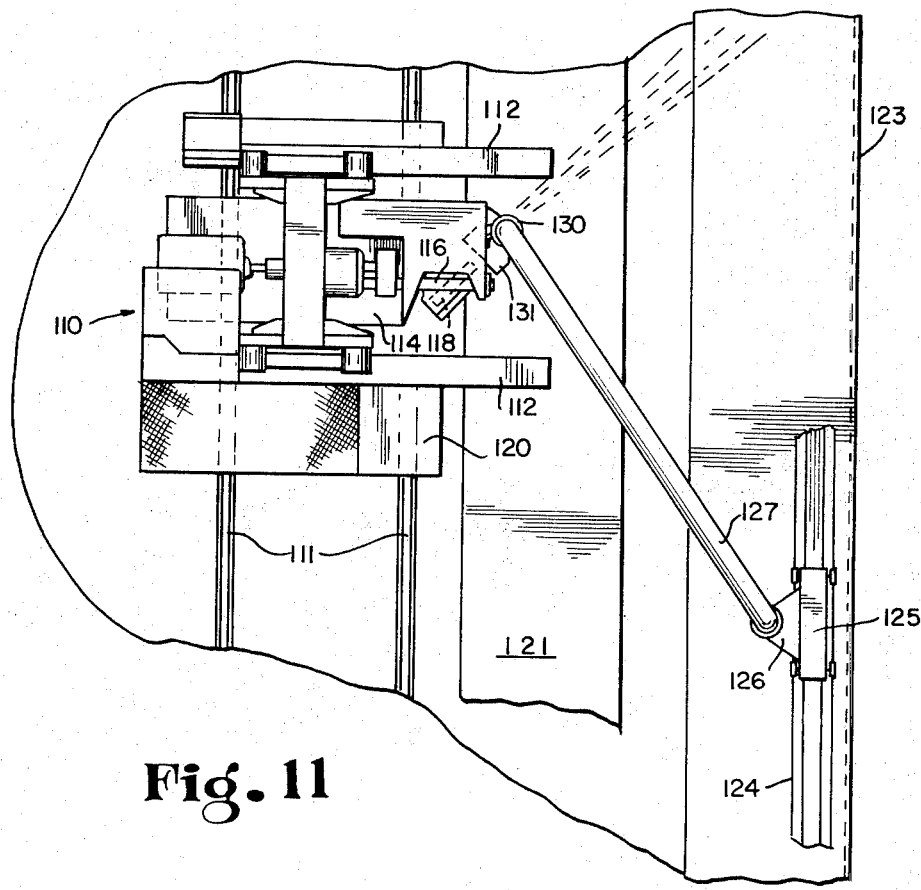
Figure 12:
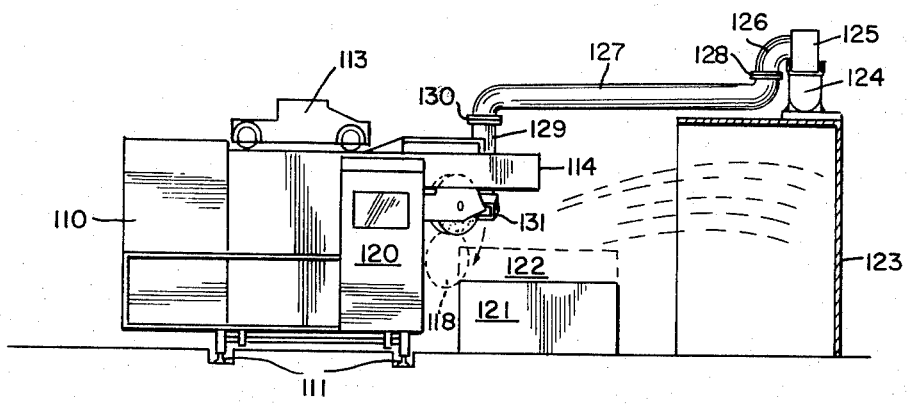
Figure 13:
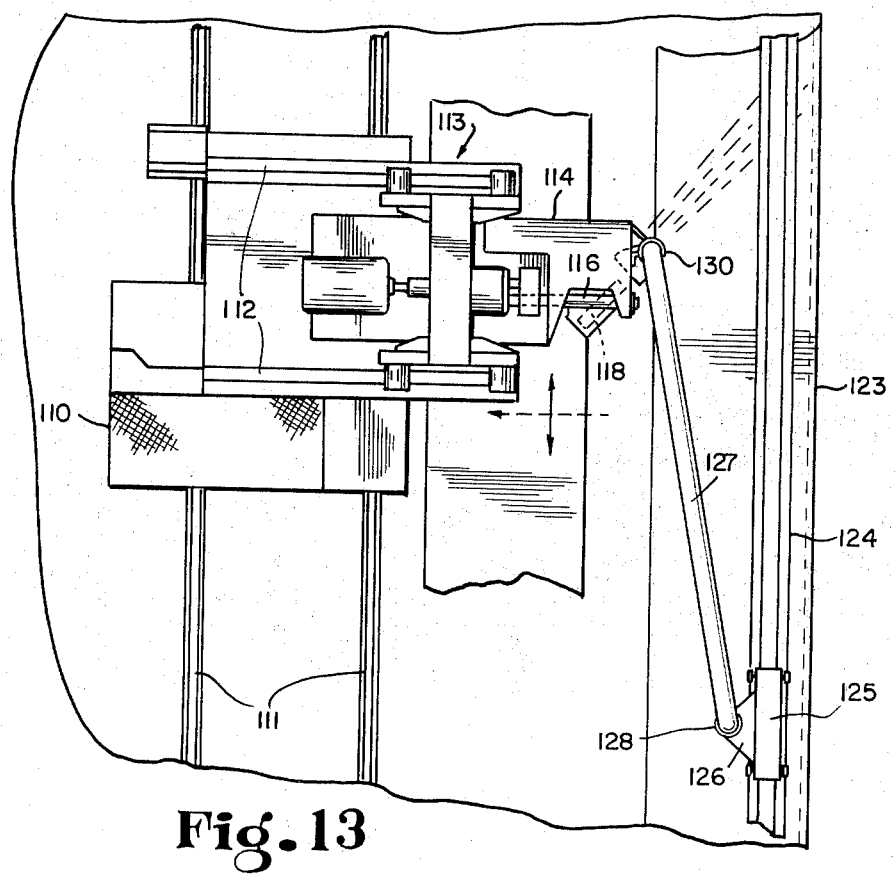
Figure 14:
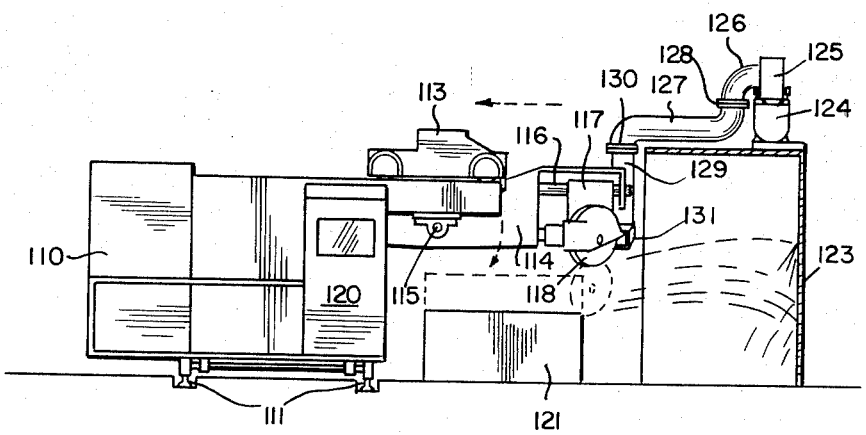

FIG. 5 is a fragmentary plan of a system generally similar to that of FIG. 3, except that the evacuated duct and associated car are of the character illustrated in U.S. Pat. No. 3,478,668, rather than that illustrated in U.S. Pat. No. 2,923,227;

FIG. 6 is a fragmentary elevation of the apparatus illustrated in FIG. 5;

FIG. 7 is a fragmentary elevation of a system generally similar to that illustrated in FIGS. 1 and 2, but showing a modified form of scoop and mounting therefor;

FIG. 8 is a plan view of the scoop of FIG. 7;

FIG. 9 is a somewhat diagrammatic, isometric view of a system generally similar to those illustrated above, but in which the tool is suspended from a traveler, in turn suspended from an elevated platform supporting the evacuated duct, and the articulated conduit means enters the duct carried car at the side remote from the operator;

FIG. 10 is a fragmentary plan view of the system of FIG. 9;

FIG. 11 is a fragmentary, top plan view of a system constructed in accordance with the present invention and applied to still heavier grinding equipment of known characteristics;

FIG. 12 is an elevation of the apparatus illustrated in FIG. 11;

FIG. 13 is a view similar to FIG. 11 but showing the relation of the parts when the grinder wheel has been advanced toward the evacuated duct;

FIG. 14 is an elevation of the system as illustrated in FIG. 13;

FIG. 15 is a fragmentary elevation, drawn to an enlarged scale, to illustrate details of boom operation and of conduit articulation;

FIG. 16 is an enlarged, fragmentary elevation of certain parts as viewed from the right of FIG. 15; and FIG. 17 is a fragmentary elevation, partly in section, taken substantially in the plane indicated by the line 17—17 of FIG. 15.

Referring more particularly to FIGS. 1 and 2, it will be seen that we have illustrated, somewhat sketchily, one known form of swing grinder, indicated generally by the reference numeral 20. The grinder comprises a carriage 21 upon which is suitably journalled a cutting wheel 22. As has been said, the term "cutting wheel" is used herein in a broad sense to refer to an abrasive device which, when brought into contact with a work piece during operation, will remove particles of the work material, whether in a cut-off operation or in what is commonly referred to as a grinding or other comparable operation. A suitable guard 23 for the wheel is provided and a motor 24 is carried on the carriage 21 and is suitably connected to drive the wheel 22. This form of swing grinder is usually suspended from above. To that end, a ring 25 may be fixed to a block or clamp 57 which, in turn, provides a journal mounting for a shaft 58 suitably fixed to the body of the carriage 21, whereby the carriage may be oscillated, through arcs of approximately 90° in each direction from its illustrated median position, about the axis of the shaft 58, without disturbing the block 57, the ring 25 or the hanger rod 26 which provides a linking connection between the ring 25 and an overhead ring 27. The ring 25, of course, is disposed in a vertical line including the center of gravity of the loaded carriage 21 so that the carriage will normally stand substantially in the horizontal position illustrated in FIG. 2.

Handle bars 28 project rigidly from the rear end of the carriage 21 whereby an operator may readily manipulate the carriage to swing it about the axis of the shaft 58, about the axis of the link 26 to the opposite, alternative positions illustrated in broken lines in FIG. 1 and forwardly and rearwardly about the axis of the ring 27 or about the axis of the ring 25. Through these movements and various combinations thereof, it will be apparent that the wheel 22 can be brought into cooperative engagement with the work 29 in a wide variety of relationships to perform varied operations upon the surface of the work.

The structure as thus far described has long been commercially available and is widely used; but in operation, it throws detached particles of the work material, and dust, in a broadcast fashion. Because the apparatus is so mobile, it has not been feasible effectively to catch and collect even the heavier particles, much less the dust emitted from the tool and the consequent pollution of the immediate environment has been not only troublesome but, in many instances, actually dangerous to the health of the workers.

According to the present invention, a continuously-evacuated, elongated duct 30 is arranged near the location of the grinder 20, one wall of said duct being closed only by a flexible web 31. A car 32 is arranged to travel along the length of the duct 30, said car defining a chamber and carrying equipment so cooperative with the web 31 that the chamber is always in open communication with the interior of the duct 30. The details of construction through which this open communication is maintained are fully disclosed in U.S. Pat. No. 2,923,227, above identified.

An air scoop 33 is suitably supported from the carriage 21 with its mouth positioned in substantial tangency to the wheel 22 so that said scoop mouth is disposed within, or close to, the stream of particles and dust emitted by the wheel during operation. The scoop mouth is arranged so close to the origin of that stream and the velocity of the air stream entering the scoop mouth is so high that the particulate stream is concentrated, and may even be bent, so that substantially all of the particulate material is captured by the scoop.

Conduit means, indicated generally by the reference numeral 34, extends between the scoop and the car 32 to maintain communication between the mouth of the scoop and the interior of the chamber in the car 32; and the conduit means is of such character as to establish a physical driving connection between the carriage 21 and the car 32 so that, no matter what may be the complexity of the gyrations of the carriage 21, the car 32 will, as a consequence, move along the duct 30, under the influence of the articulated conduit means 34, to maintain the high-velocity air flow which entrains emissions from the wheel and carries them into the duct 30, whence they are delivered, by suitable means (not shown) to a collection point.

The means and mode of articulation of the conduit means 34 are an important feature of the present invention. Thus, in the form of invention illustrated in FIGS. 1 and 2, the conduit means comprises a first section 35 perpendicularly fixed to and penetrating one wall of the car 32 to enter the chamber therewithin. A second section 36 is an elbow and is joined to the section 35 through a swivel connection 37 on a vertical axis. A third section 38 is joined to the section 36 through a swivel connection 39 on a substantially horizontal axis and, in turn, is connected to a fourth elbow section 40 through a swivel connection 41 on a horizontal axis perpendicular to the axis of the swivel connection 39. A fifth elbow section 42 is connected to the section 40 through a horizontal swivel connection 43 on a horizontal axis substantially parallel to the axis of the connection 39 and a sixth section 44 is connected to the section 42 through a swivel connection 45 on a substantially vertical axis. The remote end of the section 44 is connected to the scoop 33 through a swivel connection 46 upon an axis which is a continuation of the axis of the shaft 58. Brace means 47 extends from the block 57 to the conduit section 44 to immobilize that section relative to the block so that, when the operator, for instance, bears down on the right-hand handle bar and lifts on the left-hand handle bar 28 as viewed in FIG. 1, the carriage 21 and the scoop 23 will turn in a clockwise direction as viewed from the left, the conduit section 44 will stand still and the swivel connection 46 will permit turning movement of the scoop 33 with the carriage 21.

It will be readily perceived that, if the carriage 21 is moved toward the right as viewed in FIG. 1, the acute angular relationship of the conduit section 38 with the length of the duct 30 will cause the car 32 to move upwardly along the duct, as seen in FIG. 1, while the angle included between the conduit section 38 and the length of the duct will be decreased, various of the swivel connections coming into action during that movement. Equivalently, if the carriage 21 is moved away from the duct, the car 32 will be caused to move downwardly along that duct, as viewed in FIG. 1 and the angle included between the conduit section 38 and the length of the duct will be enlarged.

Similarly, if the carriage 21 is turned about the axis of the hanger 26 in a clockwise direction toward the lower shadow position of FIG. 1, it is obvious that both components of the path of the axis of the swivel connection 45 will tend to move the car 32 downwardly along the duct 30, as viewed in FIG. 1.

In the form of invention illustrated in FIGS. 3 and 4, it will be apparent that the carriage 21 and its directly associated parts, and the duct 30 and car 32 and conduit section 35 will be the same as in the form illustrated in FIGS. 1 and 2. In this installation, however, the second section 48, swivel connection 49, third section 50 and swivel connection 51 are somewhat differently arranged and the fourth section 52 is reversed relative to the section 38. With its straight end associated with the section 50 through the swivel connection 53, the remote end of the section 52 is turned downwardly and connected to a fifth section 54 through a swivel connection 55. The other end of the section 54 communicates with the scoop 33 through a swivel connection 56 equivalent to the connection 46 of FIG. 2; and the section 54 is immobilized relative to the block 57 by means of the brace 47. The operation of this form of the invention is in all respects similar to that described in connection with FIGS. 1 and 2.

In the arrangement illustrated in FIGS. 5 and 6, the flexible web is arranged to guard an opening in a side, vertical wall of the duct 61 and the car 62 must therefore ride in association with that side wall, rather than the top wall, of the duct. The details of such an association are fully disclosed in the above-identified United States patent 3,478,668; but it may be briefly stated that the car is equipped with pair of canted wheels 63 which bear against the inner surface of an upstanding rail 64 on the duct, and with a pair of horizontal wheels 69 which bear against the outer surface of a depending rail 65 on the duct. In this instance, a fitting 66 is fixedly secured in perpendicular relation to the lower wall of the car 62 and communicates with the chamber therein and a section 68 of the conduit means, equivalent to the section 50 of FIG. 3, connects the section 68 with the section 52 through swivel connections 51 and 53.

In all essential respects, the system of FIGS. 5 and 6 performs in the mode of the system of FIGS. 3 and 4.

The form of invention illustrated in FIGS. 7 and 8 embodies a different form of scoop 71. As illustrated, the scoop 71 may be of rectangular cross section and may consist of a mouth section 72 of relatively small effective area, and a plurality of sections 73, 74 and 75 of progressively increasing effective cross sectional capacity. It will be apparent that, with a given degree of evacuation of the duct 30, this scoop construction will provide increased velocity of the air stream entering the scoop mouth.

FIG. 7 also illustrates a particular means 76 for securing the scoop 71 to the carriage 21 to move therewith relative to the block 57.

FIGS. 9 and 10 illustrate a different commercial form of carriage 81, a different mode of suspension of the swing grinder and a different but analogous conduit means providing a fluid connection and a driving connection between the scoop and the car providing fluid communication with the interior of the evacuated duct. In this assembly, the carriage 81 is suspended by the link 26 from a traveler 82 mounted to move along a monorail 83 suspended from a bracket or shelf 84 which carries the duct 85 which is the functional equivalent of the duct 30. This, of course, confers even greater mobility upon the carriage 81.

The car 86 is the equivalent of the car 32 except that the first conduit section 87 is secured to and penetrates that side wall of the car which is remote from the operator's station. A second section 88 communicates with the section 87 through a swivel connection 89 on a vertical axis and a third section 90, generally similar to the section 38 communicates with the section 88 through a swivel connection 91 on a horizontal axis. A fourth section 92 is an elbow connected to the section 90 through a swivel connection 93 on a horizontal axis perpendicular to the axis of the connection 91 and a fifth section 94 is connected to the section 92 through a swivel connection 95 on an axis parallel with the axis of the connection 91. A sixth section 96 communicates with the section 94 through a vertical swivel connection 97 and connects with a vertical section 99 of the scoop 100 through a swivel connection 98 on a horizontal axis.

In this illustration, we have suggested a conveyor 101 paralleling the path of the duct 85 to convey work pieces 102 successively past the grinding station. The conveyor parallels, also, the monorail 83 so that, if necessary or desirable, a particular work piece on the conveyor 101 may be followed for a significant period of time as the operator pushes the swing grinder along the path of the conveyor, causing the traveler 82 to move along the monorail 83.

In shadow outline in FIG. 9, we have suggested that, if desired, the duct 85 and car 86 may be supported on the floor, rather than on an overhead bracket system, in which case the first section 87 of the conduit means will extend upwardly, rather than downwardly, from the car.

In FIGS. 11 to 17, we have illustrated the applicability of our exhaust system to an even heavier type of grinder installation. A first automotive wheeled vehicle 110 is supported to travel on rails or trackway 111. The vehicle 110, in turn, supports rails or trackway 112 arranged in perpendicular relation to the trackway 111; and a second automotive wheeled vehicle 113 is supported to travel on the trackway 112. This arrangement, of course, provides for limited universal movement of the vehicle 113 in a single plane.

A boom 114 is supported from the vehicle 113 for vertical oscillation about the axis 115. Near its distal end, the boom 114 carries a spindle 116 from which is suspended, for oscillation about the axis of the spindle, a hanger 117 carrying a cutting wheel 118. A fluid motor 119 is connected between the boom 114 and a fixed point on the vehicle 113 to effect the above-mentioned oscillation of the boom. It will be perceived that this construction provides for limited movement of the wheel 118 relative to the vehicle 113 about separate axes. Thereby, limited universal movement of the wheel relative to the work table 121 and work 122 supported thereon is achieved so that a skillful operator in the cab 120 can manipulate the heavy wheel 118 to accomplish any desired shaping of the work 122. Customarily a bin 123 parallels the trackway 111 in such a position that the heavier particles of material emitted from the wheel 118 hopefully will be deposited and collected therein. The structure of FIGS. 11 to 17 thus far described is commercially known.

A continuously-evacuated duct 124 may conveniently be supported upon the roof of the bin 123 to parallel the trackway 111, and a car 125 defining an interior chamber is mounted to travel along the said duct with the chamber always in open communication with the interior of the duct 124 as explained in the discussion of FIG. 1. A scoop 131 is suitably fixed to the boom 114 with its mouth arranged in substantial tangency with the wheel 118 to capture emissions from the wheel, as explained above. Conduit means maintaining open communication between the scoop and the interior of the car 125 and providing, also, a driving connection between the boom 114 and said car, may comprise a first section 126 perpendicularly fixed to, and opening through, a wall of the said car. A second section 127 may be S-shaped, as shown, and is connected to the section 126 through a swivel connection 128 upon a vertical axis, and to a further section indicated generally by the reference numeral 129 through a swivel connection 130 likewise on a vertical axis. The section 129, in turn, communicates with the scoop 131 through a swivel connection 138 on a horizontal axis.

Depending upon the particular configuration of the commercial grinding assembly, the section 129 may take various forms. In the illustrated embodiment of our invention, as is most clearly to be seen in FIG. 16, the section 129 consists of an elbow 132 supported from the vehicle 113 by a clamp ring 133 and rigid brace means 134. An L-shaped section 135 is connected to the elbow 132 through a swivel connection 136 on a horizontal axis, and another L-shaped section 137 has its longer leg telescopically received in the longer, vertical leg of the section 135, while its shorter leg is connected to the scoop 131 through a swivel connection 138 having a horizontal axis and disposed in a common plane with the connection 136.

It will be perceived that the performance of the apparatus disclosed in FIGS. 11 to 17 is directly analogous to that described in the discussion of FIGS. 1 to 10. As the wheel 118 is maneuvered by manipulation of the several controls, the relationship of the scoop 131 to the wheel remains constant to entrain emissions from the wheel and to conduct them to the duct 124 for suitable disposition. In these heavier machines, it may sometimes be advisable to permit the heavier particles to be discharged to the bin 123, the scoop 131 being so disposed as to entrain only relatively light dust; and of course that can be done by so selecting the position of the scoop relative to the wheel, and the volume and velocity of the air stream flowing into the scoop mouth that such heavier particles, following a lower trajectory, will escape entrainment. Any such selective entrainment, of course, will depend to a large extend upon the relation between the advantages of substantially complete entrapment of the emissions from the wheel and the disadvantages arising from attrition upon the interior of the conduit means by the heavier particles and the capacity of the air stream effectively to move extremely heavy particles through the tortuous path of the conduit means.

What is claimed is:

1. In combination, a carriage supported for substantially universal movement in a plurality of directions and about a plurality of axes, a cutting wheel mounted for rotation about an axis carried on said carriage, means on said carriage for driving said wheel, a stationary, elongated, continuously-evacuated duct, a car mounted for travel along said duct and defining a chamber continuously in communication with the interior of said duct, a scoop having an open mouth disposed generally tangentially adjacent the periphery of said wheel to receive dust discharged from said wheel, and self-sustaining conduit means establishing communication between said scoop and the interior of said chamber and establishing a driving connection between said carriage and said car, said conduit means including a plurality of swivel connections on different axes to accommodate such substantially universal movement of said carriage.

2. The combination of claim 1 in which said carriage is suspended from an overhead point by linking means attached to said carriage at a point vertically aligned with the center of gravity of said carriage and its load.

3. The combination of claim 2 in which said linkage means is a rigid bar and the attachment of said bar to said carriage includes a free ring-and-hook means.

4. The combination of claim 2 in which said conduit means includes a first section substantially perpendicular to and rigidly fixed to a wall of said car, a second section swively connected to said first section upon a first substantially vertical axis, a third section swively connected to said second section upon a first substantially horizontal axis, a fourth section swively connected to said third section upon a second substantially horizontal axis substantially perpendicular to said first horizontal axis, a fifth section swively connected to said fourth section upon a third substantially horizontal axis substantially parallel with said first horizontal axis, and a sixth section swively connected to said fifth section upon a second substantially vertical axis, said sixth section further being swively connected to said scoop upon a fourth substantially horizontal axis, said second horizontal axis being disposed at a variable acute angle to the line of travel of said car.

5. The combination of claim 2 in which said conduit means includes a first end section rigidly fixed to a wall of said car and communicating with the interior thereof, a second end section swively connected to said scoop, at least one intermediate section having swivel connections upon relatively perpendicular axes at its opposite ends, and a plurality of further sections swively connected in said conduit means to complete a communication connection between said scoop and the interior of said car and a driving connection between said carriage and said car, said one intermediate section being disposed at a variable acute angle to the line of travel of said car.

6. The combination of claim 2 in which said conduit means includes a first section substantially perpendicular to and rigidly fixed to a wall of said car, a second section swively connected to said first section upon a first substantially vertical axis, a third section swively connected to said second section upon a first substantially horizontal axis, a fourth section swively connected to said third section upon a second substantially horizontal axis substantially perpendicular to said first horizontal axis, a fifth section swively connected to said fourth section upon a second substantially vertical axis and swively connected to said scoop upon a third substantially horizontal axis, said first horizontal axis being disposed at a variable acute angle to the line of travel of said car.

7. The combination of claim 1 in which said carriage comprises a first wheeled vehicle reciprocable upon a first trackway, a second trackway on said first vehicle and arranged transversely relative to said first trackway, a second wheeled vehicle reciprocable upon said second trackway, and a boom mounted on said second vehicle to rock about an axis transverse relative to said second trackway, means on said first vehicle for driving said first vehicle reversely along said first trackway, means for driving said second vehicle reversely along said second trackway, and power means for rocking said boom, said cutting wheel being mounted on said boom.

8. The combination of claim 7 in which said conduit means comprises a first section substantially perpendicular to and rigidly fixed to a wall of said car, a second section swively connected to said first section upon a first substantially vertical axis, and a third section swively connected to said second section upon a second substantially vertical axis, said third section further being connected to said scoop, and said third section further being extensible and contractable in length.

9. The combination of claim 8 in which one of said trackways is substantially parallel with said duct.

10. The combination of claim 9 in which a line joining said vertical axes is disposed at a variable acute angle to the line of travel of said car.

* * * * *

UNITED STATES PATENT OFFICE
CERTIFICATE OF CORRECTION

Patent No. 3,698,137   Dated October 17, 1972

Inventor(s) Robert C. Overmyer and John R. Scheel

It is certified that error appears in the above-identified patent and that said Letters Patent are hereby corrected as shown below:

Column 4, line 21, "that" should be -- the --; line 57, after "with" and before "pair" insert -- a --.
Column 7, line 13, "extend" should be -- extent --; line 45 (Claim 3, line 1), "linkage" should be -- linking --.

Signed and sealed this 24th day of April 1973.

(SEAL)
Attest:

EDWARD M. FLETCHER, JR.
Attesting Officer

ROBERT GOTTSCHALK
Commissioner of Patents